United States Patent
Longoria

(10) Patent No.: US 6,425,260 B1
(45) Date of Patent: Jul. 30, 2002

(54) TORTILLA COOLING CONVEYOR WITH DISTRIBUTED AIR DIFFUSION

(75) Inventor: Jose L. Longoria, Plainview, TX (US)

(73) Assignee: ITE, Inc., Plainview, TX (US)

(*) Notice: Subject to any disclaimer, the term of this patent is extended or adjusted under 35 U.S.C. 154(b) by 0 days.

(21) Appl. No.: 09/648,336

(22) Filed: Aug. 25, 2000

Related U.S. Application Data

(60) Provisional application No. 60/156,574, filed on Sep. 29, 1999.

(51) Int. Cl.$^7$ .............................................. F25D 25/04
(52) U.S. Cl. ................... 62/380; 62/63; 62/418
(58) Field of Search ..................... 62/63, 380, 418

(56) References Cited

U.S. PATENT DOCUMENTS

| | | | |
|---|---|---|---|
| 3,688,518 A | * 9/1972 | Goltos | 62/380 |
| 3,993,788 A | 11/1976 | Longenecker | 62/374 |
| 4,715,272 A | 12/1987 | Mendoza | 99/339 |
| 4,978,548 A | 12/1990 | Cope et al. | 426/439 |
| 5,123,261 A | 6/1992 | Cope | 426/243 |
| 5,448,898 A | * 9/1995 | Rothstein | 62/63 |
| 5,452,588 A | * 9/1995 | Onodera | 62/63 |

* cited by examiner

Primary Examiner—Ronald Capossela
(74) Attorney, Agent, or Firm—Daniel V. Thompson

(57) ABSTRACT

A tortilla cooling conveyor with distributed air diffusion (10) having a a housing (12) with chambers separated by a perforated top baffle plate (18T) and a perforated bottom baffle plate (18B). A plurality of perforated conveyors have curved guides at opposite distal ends to orientate the tortillas. Coils/fan are located in the bottom chamber to produce cool dry air which desiccates and reduces the temperature of the newly manufactured tortillas.

7 Claims, 3 Drawing Sheets

TORTILLA COOLING CONVEYOR WITH DISTRIBUTED AIR DIFFUSION

This application claims the benefit of provisional application No. 60/156,574, filed Sep. 29, 1999.

TECHNICAL FIELD

The present invention relates to manufacturing tortillas. More particularly, the present invention relates to a tortilla apparatus which cools and drys the newly manufactured moist hot tortillas.

BACKGROUND ART

Numerous innovations for tortilla cooling systems have been provided in the prior art that are described as follows. Even though these innovations may be suitable for the specific individual purposes to which they address, they differ from the present invention as hereinafter contrasted.

U.S. Pat. No. 5,123,261, Titled, "Cooling Tunnel for Food Products," invented by Cope, discloses a cooling tunnel for baked tortillas and the like, the tunnel having a housing defining a cooling space, an aperatured product conveyor for moving the product to be cooled through the cooling space, means for moving cooling gas over the tortillas in the cooling space, closed loop flexible hold down chains, supports for positioning the hold down chains in the cooling space for resting on the conveyor, and a drive for moving the hold down chains through the cooling space along with the conveyor with the tortillas between the hold down chains and the conveyor.

U.S. Pat. No. 4,978,548, Titled, "Method and Apparatus for Continuous Producing of Tortilla Chips," invented by Cope, et. al., discloses a method and apparatus for continuous production of tortilla chips, including mixing tortilla flour and water to form a dough, rolling the dough into a continuous sheet, cutting tortilla shapes from the sheet, moving the tortilla shapes continuously through a baking oven to produce baked products, moving the baked products continuously along an equilibration conveyor to substantially equalize the moisture content of each baked product throughout the product to form an equilibrated product, moving the equilibrated product continuously through a refrigeration unit to cool the product to form a cooled product, cutting the cooled products into chip shapes, and moving the chip shapes to a fryer to produce the tortilla chips. The frying step may be continuous or batch as desired.

U.S. Pat. No. 4,715,272, Titled, "System for Preparing Tortillas," invented by Mendoza, discloses a system for preparing tortillas including a tortilla cooking oven and a cooked tortilla cooling device associated with the oven. The cooking oven has an entrance at which uncooked tortillas are received and an exit from which cooked tortillas are discharged. The oven also include a plurality of superposed transporting members which define a cooking path along which each tortilla travels through the oven and in which each of the opposite sides of the tortilla at separate portions of the path are subjected to cooking at the same temperature and over the same amount of time. The cooling device associated the oven is adapted to receive cooked tortillas from the exit of the oven and to form a cushion of pressurized air whereby the tortillas can be moved on the air cushion along a predetermined cooling path, for example by operator assist, such that the cooked tortillas are cooled by the time they reach the end of the cooling path.

U.S. Pat. No. 3,993,788, Titled, "Continuous High-speed Cooking and Cooling Method Using Pre-heated Ingredients and Predetermined Radiant Heating Patterns for the Production of Tortillas and Similar Products," invented by Longenecker, discloses a method and system for continuous high-speed commercial cooking and cooling using pre-heated dough ingredients for making products such as tortillas, provides predetermined specific heating patterns in an infrared cooking sequence which assures consistent product characteristics. Dough blanks formed of pre-heated ingredients are conveyed past predetermined sequences of infrared burners within an oven along a series of paths to sequentially expose alternate sides of the pre-heated ingredients to intensive radiant heating patterns each of decreasing heat intensity and of predetermined short time duration. Conveyors within the oven are synchronized to maintain blank spacing similar throughout the cooking process and turnaround chute means reverse and transfer blanks from one conveyor to another for alternatively exposing opposite sides of the articles to the radiant heaters. Burner cooling and fume exhaust is obtained by introducing air near the center of the oven and discharging it at the oven ends. Ignition of gas burners and flame sensing is accomplished through full burning pilot tube means extending the length of each bank of radiant heating burners. A subsequent high velocity and lengthy travel of the cooked tortillas while they are being individually exposed to ambient air serves to cool the tortillas and to permit escape of any residual internal free moisture, thereby avoiding the subsequent release of moisture or softening of the cooked and attractively browned surface skin layers for enabling stacking without sticking together.

Numerous innovations for tortilla cooling systems have been provided in the prior art that are adapted to be used. Even though these innovations may be suitable for the specific individual purposes to which they address, they would not be suitable for the purposes of the present invention as heretofore described.

SUMMARY OF THE INVENTION

The present invention relates to a tortilla apparatus which cools and drys the newly manufactured moist hot tortillas, preventing them from sticking, utilizing a unique upper and lower perforated baffling system in combination with top, bottom and right chambers.

The types of problems encountered in the prior art are the length of time required to cool tortillas in ambient air and that tortillas stick together after manufacturing.

In the prior art, unsuccessful attempts to solve this problem typically used flour and other desiccating agents. However, the problem was solved by the present invention because it employs a distributed diffusion respiration/refrigeration system to desiccate the tortillas after manufacture.

Innovations within the prior art are rapidly being exploited in the field of food manufacture.

The present invention went contrary to the teaching of the art which describes and claims numerous other desiccating methods other than respiration.

The present invention solved a long felt need for a simple effective tortilla desiccating system.

Accordingly, it is an object of the present invention to provide a tortilla cooling conveyor with distributed air diffusion having a housing having a top chamber and a bottom chamber and a right chamber, coils/fan connected to a refrigeration compressor, top baffle plate with top baffle plate openings, bottom baffle plate with bottom baffle plate openings, conveyors, and curved guides.

More particularly, it is an object of the present invention to provide the housing having a housing top, housing bottom, housing front with a housing front ingress, housing back with a housing back egress, housing left, housing right, housing right inner, housing right inner top opening, and housing right inner bottom opening.

In keeping with these objects, and with others which will become apparent hereinafter, one feature of the present invention resides, briefly stated, in the conveyors having a first conveyor, second conveyor, third conveyor, fourth conveyor, fifth conveyor, sixth conveyor, and seventh conveyor.

When the curved guide is designed in accordance with the present invention, it comprises a first right curved guide, first left curved guide, second right curved guide, second left curved guide, third right curved guide, and third left curved guide.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

LIST OF REFERENCE NUMERALS UTILIZED IN THE DRAWINGS

10—tortilla cooling conveyor with distributed air diffusion (10)
12—housing (12)
12T—housing top (12T)
12A—housing bottom (12A)
12F—housing front (12F)
12FA—housing front ingress (12FA)
12B—housing back (12B)
12BA—housing back egress (12BA)
12L—housing left (12L)
12R—housing right (12R)
12RI—housing right inner (12RI)
12RIT—housing right inner top opening (12RIT)
12RIB—housing right inner bottom opening (not shown)
14—conveyor air flow (14)
16—coils/fan (16)
18T—top baffle plate (18T)
18TA—top baffle plate opening (18TA)
18B—bottom baffle plate (18B)
18BA—bottom baffle plate opening (not shown)
20A—first conveyor (20A)
20B—second conveyor (20B)
20C—third conveyor (20C)
20D—fourth conveyor (20D)
20F—fifth conveyor (20F)
20G—sixth conveyor (20G)
20H—seventh conveyor (20H)
22AR—first right curved guide (22AR)
22AL—first left curved guide (not shown)
22BR—second right curved guide (22BR)
22BL—second left curved guide (not shown)
22CR—third right curved guide (not shown)
22CL—third left curved guide (not shown)
24—refrigeration compressor (24)
26A—egress air (26A)
26B—ingress air (26B)
28—ingress tortilla (28)
30—egress tortilla (30)
34T—top chamber (34T)
34B—bottom chamber (34B)
34S—side chamber (34S)

DESCRIPTION OF THE PREFERRED EMBODIMENT

Figure 1:
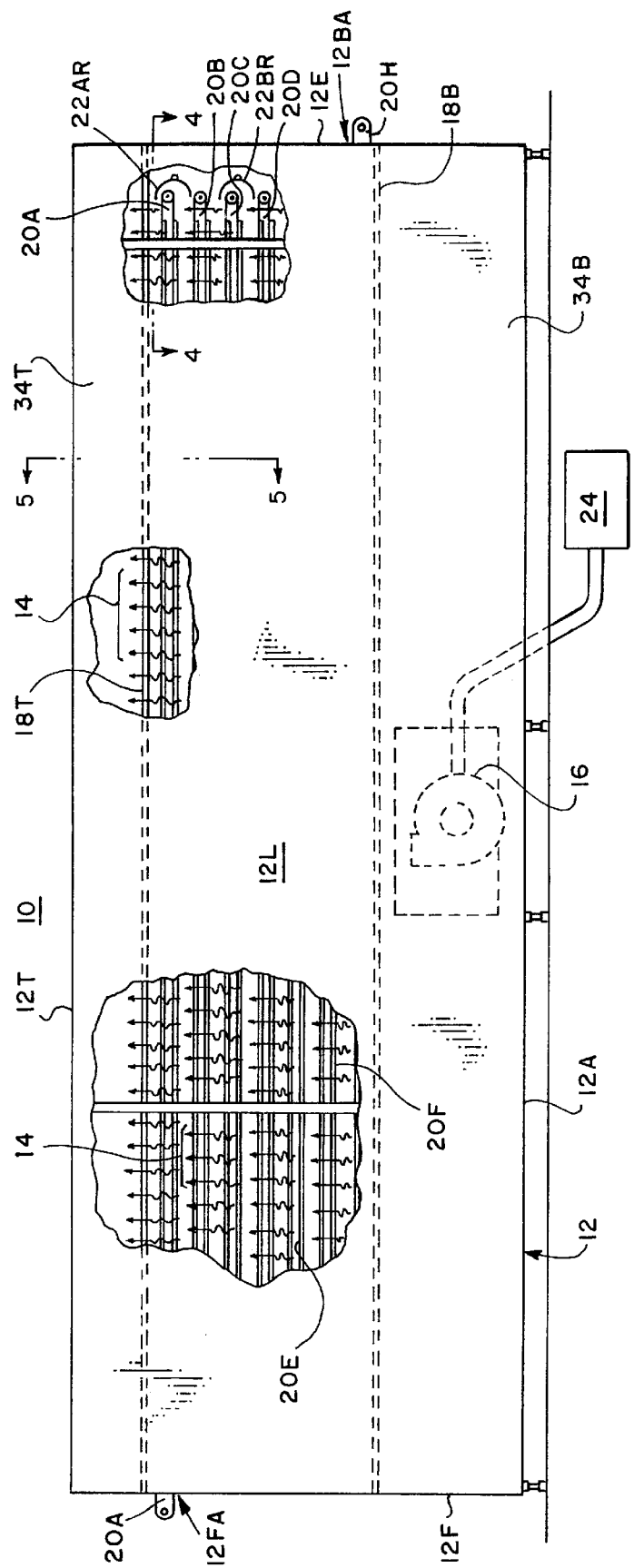
FIG. 1 is a left side partial cutaway view of a tortilla cooling conveyor with distributed air diffusion (10).
Figure 2:
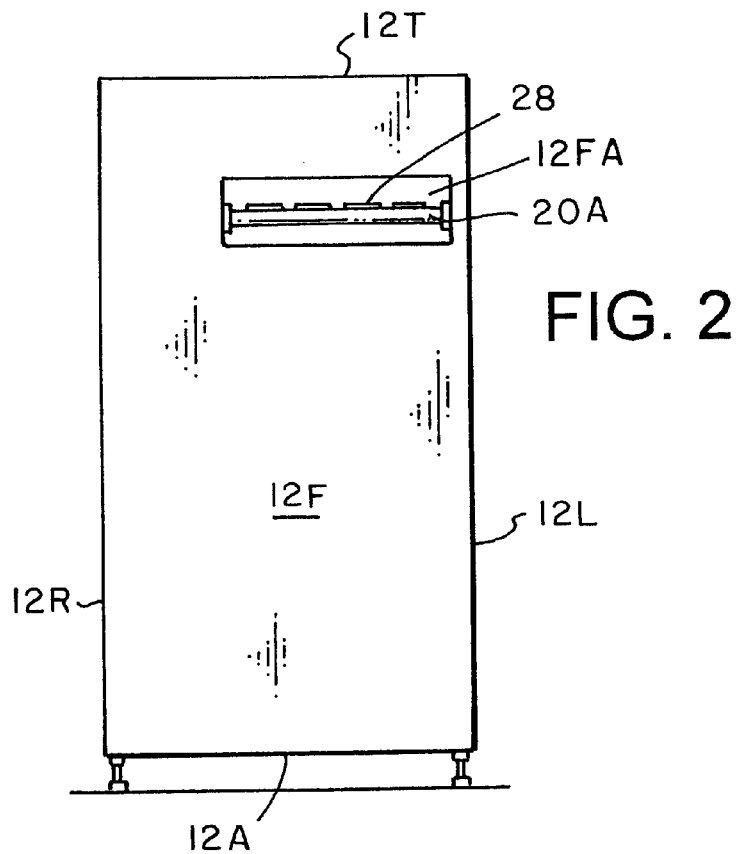
FIG. 2 is a front view of a tortilla cooling conveyor with distributed air diffusion (10).

Referring to FIG. 1 tortilla cooling conveyor (10) includes a housing (12), which includes a housing top (12T), housing bottom (12A), housing front (12F), housing back (12B), housing left (12L), housing right (12R), housing right inner (12RI) having a plurality of housing right inner top openings (12RIT) therethrough, and housing right inner bottom opening (not shown).

The tortilla cooling conveyor (10) further includes a top baffle plate (18T) positioned at a top end of the housing (12) having a plurality of top baffle plate openings (18TA) therethrough. The top baffle plate (18T) is sealably securely attached along an outer periphery to the housing front (12F), housing back (12B), housing left (12L), housing right (12R), and housing right inner (12RI) forming a top chamber (34T) therebetween.

The tortilla cooling conveyor (10) further includes a bottom baffle plate (18B) positioned at a bottom end of the housing (12) having a plurality of bottom baffle plate openings (not shown) therethrough, similar to top baffle plate (18T). The bottom baffle plate (18B) is sealably securely attached along an outer periphery to the housing front (12F), the housing back (12B), the housing left (12L), the housing right (12R), and housing right inner (12RI) forming a bottom chamber (34B) therebetween.

The baffle plates (18T, 18B) are designed to evenly distribute air diffusion of conveyor air flow (14) past the tortillas. In the preferred embodiment, the baffle plates (18T, 18B) are finely perforated, having top baffle plate openings (18TA) and bottom baffle plate openings (not shown) on the order of $3/16$" in diameter on 1" centers across the baffle plates.

Figure 3:
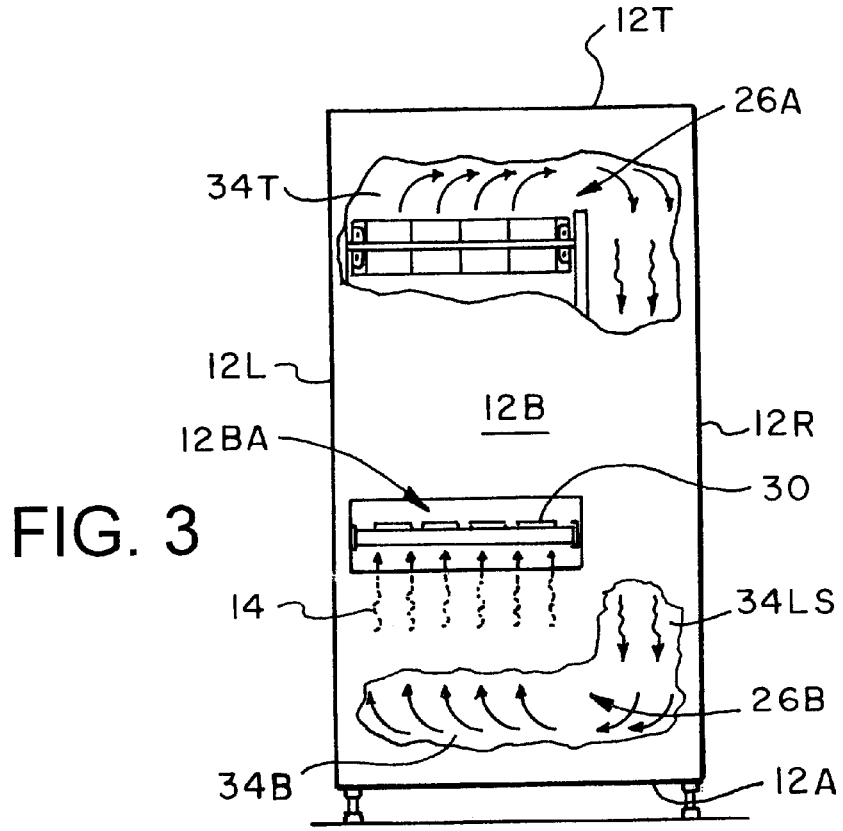
FIG. 3 is a back partial cutaway view of a tortilla cooling conveyor with distributed air diffusion (10) exhibiting egress air (26A) flowing from the top chamber (34T) through the side chamber (34S) into the bottom chamber (34B) forming ingress air (26B).
Figure 4:
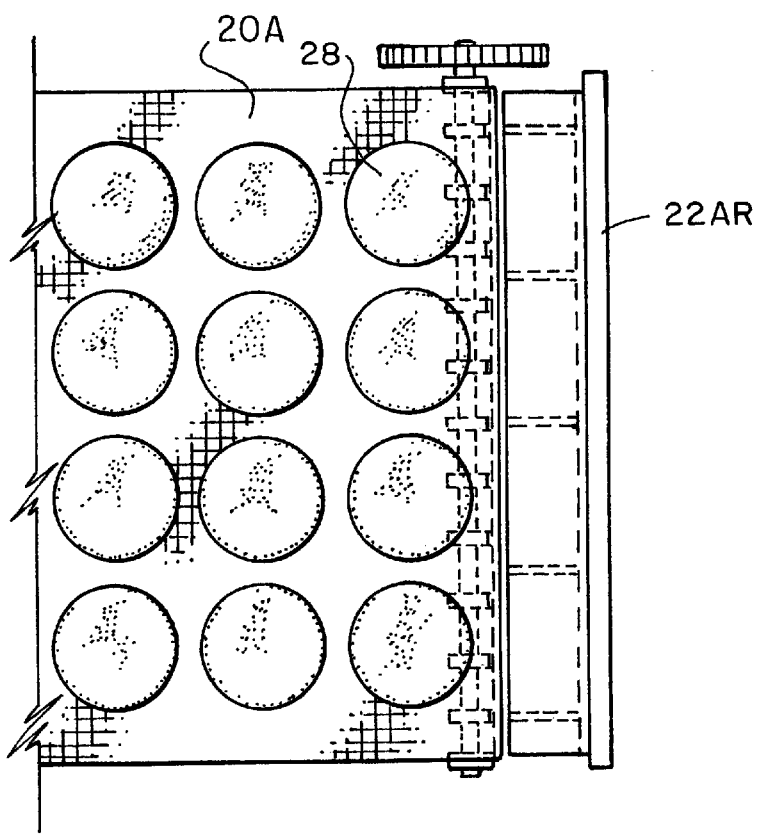
FIG. 4 is a view along line 4—4 of FIG. 1 exhibiting a perforated first conveyor (20A).
Figure 5:
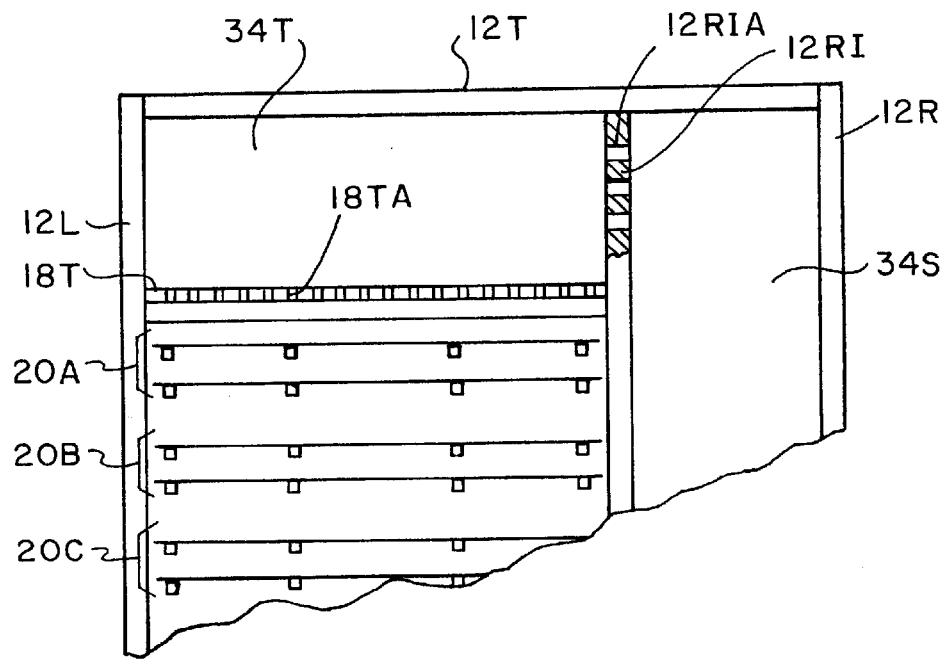
FIG. 5 is a view along line 5—5 of FIG. 1 exhibiting a plurality of conveyors, top chamber (34T) and side chamber (34S).

The tortilla cooling conveyor (10) further includes a side chamber (34S) (refer to FIG. 3) formed between the housing top (12T), the housing bottom (12A), the housing right inner (12RI) and the housing right (12R). Egress air (26A) flows from the top chamber (34T) through the plurality of top baffle plate openings (18TA) through the side chamber (34S) through the plurality of bottom baffle plate openings (not shown) into the bottom chamber (34B) forming ingress air (26B).

In a more complex embodiment of the invention, a plurality of perforated conveyors include first or ingress conveyor (20A), second conveyor (20B), third conveyor (20C), fourth conveyor (20D), fifth conveyor (20F), sixth conveyor (20G), and seventh or egress conveyor (20H). The first right curved guide (22AR) is positioned over a right distal end of the ingress conveyor (20A) and second conveyor (20B). The first right curved guide (22AR) functions to transfer warm moist ingress tortillas (28) from the ingress conveyor (20A) to the second conveyor (20B). The first left curved guide (not shown) is positioned over a left distal end of the second conveyor (20B) and the third conveyor (20C). The first left curved guide (not shown) functions to transfer the warm moist ingress tortillas (28) from the second conveyor (20B) to the third conveyor (20C). A second right curved guide (22BR) is positioned over a right distal end of the third conveyor (20C) and the fourth conveyor (20D). The second right curved guide (22BR) functions to transfer warm moist ingress tortillas (28) from the third conveyor (20C) to the fourth conveyor (20D). A second left curved guide (not shown) is positioned over a left distal end of the fourth conveyor (20D) and the fifth conveyor (20F). The second left curved guide (not shown) functions to transfer the warm moist ingress tortillas (28) from the fourth conveyor (20D) to the fifth conveyor (20F). A third right curved guide (not shown) is positioned over a right distal end of the fifth conveyor (20F) and the sixth conveyor (20G). The third right curved guide (not shown) functions to transfer warm moist ingress tortillas (28) from the fifth conveyor (20F) to the sixth conveyor (20G). A third left curved guide (not shown) is positioned over a left distal end of the sixth conveyor (20G) and the seventh or egress conveyor (20H). The third left curved guide (not shown) functions to transfer the cool dry egress tortillas (30) from the sixth conveyor (20G) to the egress conveyor (20H).

In a simpler form of the invention, the plurality of perforated conveyors include an ingress conveyor (20A), a middle conveyor (20B, 20C, 20D, 20E, 20F or 20G) and an egress conveyor (20H). Curved guides are similarly utilized to transfer tortillas between conveyors.

The tortilla cooling conveyor (10) further includes at least one coils/fan (16) positioned in the bottom chamber (34B) functioning to cool the ingress air (26B). The at least one coils/fan (16) is connected to at least one refrigeration compressor (24) in conventional fashion. The coils/fan (16) function to constantly cool and remove moisture from the egress air (26A) forming cool dry ingress air (26B) for cooling purging excess moisture from the tortillas.

In operation, the key feature of the invention is the use of finely perforated baffle plates above and below the conveyors to diffuse the flow of refrigerated air through the conveyor housing. Tortillas are light in weight but large in area, which makes them prone to being blown around if cooling air hits them with too much velocity. The conveyor construction itself is conventional, and normally used with ambient air cooling and no housing or refrigeration. Refrigeration has a secondary effect of drying the tortilla surfaces to prevent sticking.

In one example of the invention, top and bottom baffle plates had perforations 3/16" in diameter on 1" centers. The cooled volume of the housing was 27' long, 6' high and 4' wide. The coils/fan produced 5000 cu. ft per min. of cooled air. Ducting was provided in the housing to insure proper air flow, as will be readily understood by one skilled in the art.

It will be understood that the orientations of top, bottom, side, front, back, right and left are not important to the operation of the invention, and equivalent constructions can be made with the parts reoriented. For example, the housing could have the perforated baffle plates on the sides and achieve an equivalent effect. A multitude of other orientations are possible for equivalent function.

It will be understood that each of the elements described above, or two or more together, may also find a useful application in other types of constructions differing from the type described above.

While the invention has been illustrated and described as embodied in a tortilla cooling system, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A tortilla cooling conveyor with distributed air diffusion (10) comprising;
   A) a housing (12);
   B) a top baffle plate (18T) positioned at a top end of the housing (12) having a plurality of top baffle plate openings (18TA) therethrough;
   C) a bottom baffle plate (18B) positioned at a bottom end of the housing (12) having a plurality of bottom baffle plate openings therethrough;
   D) a side chamber (34S) formed with the housing, such that egress air (26A) flows into a top chamber (34T) through the plurality of top baffle plate openings (18TA) through the side chamber (34S) and into the bottom chamber (34B) through the plurality of bottom baffle plate openings, forming ingress air (26B);
   E) at least one coils/fan (16) in communication with the bottom chamber (34B) functioning to cool the ingress air (26B), the at least one coils/fan (16) is connected to at least one refrigeration compressor (24);
   F) at least three perforated conveyors positioned within the housing (12), with an ingress conveyor positioned in a housing front ingress (12FA), an egress conveyor positioned in a housing back egress (12BA), and a middle conveyor positioned between the ingress conveyor and the egress conveyor;
   G) with cool ingress air (26B) from the bottom chamber (34B) flowing with distributed diffusion through the at least three perforated conveyors forming conveyor air flow (14) around the ingress tortillas (28) and forming warm egress air (26A) flowing with distributed diffusion into the top chamber (34T) and recirculated to the bottom chamber (34B) through the side chamber (34S).

2. The tortilla cooling conveyor of claim 1 with the housing (12) including a housing top (12T), housing bottom (12A), housing front (12F), housing back (12B), housing left (12L), housing right (12R), and housing right inner (12RI) having a plurality of housing right inner top openings (12RIT) therethrough and housing right inner bottom opening therethrough.

3. The tortilla cooling conveyor of claim 2 with the top baffle plate (18T) being sealably securely attached along an outer periphery to the housing front (12F), housing back (12B), housing left (12L), housing right (12R), and the housing right inner (12RI) forming a top chamber (34T) therebetween.

4. The tortilla cooling conveyor of claim 2 with the bottom baffle plate (18B) being sealably securely attached along an outer periphery to the housing front (12F), housing back (12B), housing left (12L), housing right (12R), and the housing right inner (12RI) forming a bottom chamber (34B) therebetween.

5. The tortilla cooling conveyor of claim 2 with a side chamber (34S) formed with the housing between the housing top (12T), housing bottom (12A), housing right inner (12RI), and the housing right (12R).

6. The tortilla cooling conveyor of claim 1 with the at least one coils/fan (16) positioned in the bottom chamber (34B).

7. A tortilla cooling conveyor with distributed air diffusion (10) comprising;

A) a housing (12), including a housing top (12T), housing bottom (12A), housing front (12F), housing back (12B), housing left (12L), housing right (12R), and housing right inner (12RI) having a plurality of housing right inner top openings (12RIT) therethrough and housing right inner bottom opening therethrough;

B) a top baffle plate (18T) positioned at a top end of the housing (12) having a plurality of top baffle plate openings (18TA) therethrough, the top baffle plate (18T) being sealably securely attached along an outer periphery to the housing front (12F), housing back (12B), housing left (12L), housing right (12R), and the housing right inner (12RI) forming a top chamber (34T) therebetween;

C) a bottom baffle plate (18B) positioned at a bottom end of the housing (12) having a plurality of bottom baffle plate openings therethrough, the bottom baffle plate (18B) being sealably securely attached along an outer periphery to the housing front (12F), housing back (12B), housing left (12L), housing right (12R), and the housing right inner (12RI) forming a bottom chamber (34B) therebetween;

D) a side chamber (34S) formed between the housing top (12T), housing bottom (12A), housing right inner (12RI), and the housing right (12R), such that egress air (26A) flows into the top chamber (34T) through the plurality of top baffle plate openings (18TA) through the side chamber (34S) and into the bottom chamber (34B) through the plurality of bottom baffle plate openings, forming ingress air (26B);

E) at least one coils/fan (16) is positioned in the bottom chamber (34B) functioning to cool the ingress air (26B), the at least one coils/fan (16) is connected to at least one refrigeration compressor (24);

F) at least three perforated conveyors positioned within the housing (12), with an ingress conveyor positioned in a housing front ingress (12FA), an egress conveyor positioned in a housing back egress (12BA), and a middle conveyor positioned between the ingress conveyor and the egress conveyor;

G) a first right curved guide (22AR) is positioned over a right distal end of the ingress conveyor and the middle conveyor, the first right curved guide (22AR) constructed and adapted to transfer warm moist ingress tortillas (28) from the ingress conveyor to the middle conveyor; and H) a first left curved guide positioned over a left distal end of the middle conveyor and the egress conveyor, the first left curved guide constructed and adapted to transfer the warm moist ingress tortillas (28) from the middle conveyor to the egress conveyor forming a dry cool egress tortilla (30), with cool ingress air (26B) from the bottom chamber (34B) flowing with distributed diffusion through the at least three perforated conveyors forming conveyor air flow (14) around the ingress tortillas (28) and forming warm egress air (26A) flowing with distributed diffusion into the top chamber (34T) and recirculated to the bottom chamber (34B) through the side chamber (34S).

* * * * *